(12) United States Patent
Wu et al.

(10) Patent No.: US 12,333,501 B2
(45) Date of Patent: Jun. 17, 2025

(54) USING UNSUPERVISED MACHINE LEARNING TO IDENTIFY ATTRIBUTE VALUES AS RELATED TO AN INPUT

(71) Applicant: Microsoft Technology Licensing, LLC, Redmond, WA (US)

(72) Inventors: Liwei Wu, Davis, CA (US); Lichao Ni, Sunnyvale, CA (US); Mikaela Makalinao Guerrero, Downey, CA (US); Yanen Li, Hillsborough, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 17/935,060

(22) Filed: Sep. 23, 2022

(65) Prior Publication Data
US 2024/0104506 A1   Mar. 28, 2024

(51) Int. Cl.
*G06Q 10/1053* (2023.01)
(52) U.S. Cl.
CPC ................. *G06Q 10/1053* (2013.01)
(58) Field of Classification Search
CPC .................................. G06Q 10/1053
See application file for complete search history.

(56) References Cited

U.S. PATENT DOCUMENTS 7,761,320 B2 * 7/2010 Fliess ............... G06Q 10/04
  707/999.005
11,961,156 B2 * 4/2024 Aguilar Achiaga . G06Q 10/105

2016/0092998 A1 * 3/2016 Goel ................ G06Q 10/1053
  705/319
2018/0096306 A1 * 4/2018 Wang ................. G06Q 50/01
(Continued)

FOREIGN PATENT DOCUMENTS

WO   WO-2022125096 A1 * 6/2022   ........ G06Q 10/1053

OTHER PUBLICATIONS

Ioannis Konstantinidis et al., Knowledge-driven Unsupervised Skills Extraction for Graph-based Talent Matching, Sep. 7-9, 2022, In 12th Hellenic Conference on Artificial Intelligence (SETN 2022), Association for Computing Machinery, New York, NY, USA, Article 28, 1-7. (Year: 2022).*

(Continued)

*Primary Examiner* — Andrew Chase Lakhani
*Assistant Examiner* — Karma A El-Chanti
(74) *Attorney, Agent, or Firm* — NICHOLSON DE VOS WEBSTER & ELLIOTT LLP (57) ABSTRACT

Technologies for skill taxonomy management are described. Embodiments include extracting an input text from an online system and applying an unsupervised generative text machine learning model to the input text. The text generator generates a set of sentences based on a job title included in the input text. One or more skills are extracted from the set of sentences. The extracted one or more skills correspond to one or more skills in a skill taxonomy. A frequency distribution is generated over the extracted one or more skills. The one or more skills are ranked based on the frequency distribution. Based on the ranking, a subset of the extracted one or more skills is generated. The subset of the extracted one or more skills is provided to a downstream operation, process, or service of the online system.

20 Claims, 5 Drawing Sheets

(56) References Cited

U.S. PATENT DOCUMENTS

| | | | | |
|---|---|---|---|---|
| 2018/0121880 | A1* | 5/2018 | Zhang | G06Q 50/01 |
| 2018/0181544 | A1* | 6/2018 | Zhang | G06N 3/044 |
| 2018/0261118 | A1* | 9/2018 | Morris | G09B 5/12 |
| 2019/0236718 | A1* | 8/2019 | Rastkar | H04L 67/306 |
| 2019/0385123 | A1* | 12/2019 | Sawarkar | G06N 3/08 |
| 2022/0327946 | A1* | 10/2022 | Rushkin | G09B 5/02 |
| 2022/0343250 | A1* | 10/2022 | Tremblay | G06Q 10/0633 |
| 2023/0214736 | A1* | 7/2023 | Stavarache | G06Q 10/06375 |
| | | | | 705/7.14 |

OTHER PUBLICATIONS

"GPT-Neo 2.7B", Retrieved from: https://web.archive.org/web/20220530040913/https://huggingface.co/EleutherAI/gpt-neo-2.7B, May 30, 2022, 5 Pages.

Gao, et al., "The Pile: An 800GB Dataset of Diverse Text for Language Modeling", In Repository of arXiv:2101.00027v1, Dec. 31, 2020, 39 Pages.

Radford, et al., "Improving Language Understanding by Generative Pre-Training", Retrieved from: https://s3-us-west-2.amazonaws.com/openai-assets/research-covers/language-unsupervised/language_understanding_paper.pdf, 2018, pp. 1-12.

Radford, et al., "Language Models Are Unsupervised Multitask Learners", In Journal of OpenAI Blog, vol. 1, Issue 8, Feb. 24, 2019, 24 Pages.

* cited by examiner

USING UNSUPERVISED MACHINE LEARNING TO IDENTIFY ATTRIBUTE VALUES AS RELATED TO AN INPUT

TECHNICAL FIELD

The present disclosure generally relates to online systems, including managing an attribute taxonomy for machine learning and/or other downstream operations, processes, or services of the online systems.

BACKGROUND

Online platforms, such as social graph applications or social media platforms, receive increasing amounts of text data, including attribute data, associated with user profiles, content descriptions, and content recommendations. In large scale data processing, various portions of such data have many uses, including but not limited to uses as features for training machine learning models and/or recommendation systems.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing an attribute taxonomy, such as a skill taxonomy, and identifying attribute values, such as skills, that are related to a particular input, such as a job title. As online social graph applications continue to grow, identifying and sorting attribute values, such as skills, among job postings, user profiles, resumes, and/or other entities in the social graph, is increasingly challenging, particularly when no standardized set of attribute values exists. While large unlabeled text corpora are abundant, labeled data suitable for learning relationships between attribute values and inputs are scarce. This makes it challenging for discriminative models trained using supervised machine learning to perform adequately. For example, supervised learning methodologies have produced unsatisfactory results in tasks such as identifying relevant skills for a given job title. This is most likely due to the lack of available labeled data and the challenges of semantic interpretation relating to the inference task.

Aspects of the present disclosure address the above and other deficiencies by training a generative language model, e.g., a text generator, by applying unsupervised machine learning to a large and broad, e.g., domain independent, set of unlabeled and unstructured textual training data. For example, the set of the unlabeled textual training data used to train the text generator can include any or all portions of unlabeled, unstructured text data that may be accessible to the model trainer by an internet connection, digital library connection, or other content distribution platform. By training the generative text machine learning model with such diverse text data across the digital content ecosystem, the generative text machine learning model is not limited to domain-specific sources of training data, such as a job search platform or an industry-specific corpus, nor is it limited to the use of labeled data. Since labeled training data is not required, the above-mentioned problems resulting from limited availability of labeled data are overcome. Additionally, by training the generative text machine learning model by applying unsupervised machine learning to non-domain specific text data, the resulting skill taxonomy manager can determine relationships between job titles and skills on a large scale. Using the described approaches provides a scalable solution for managing and curating sets of attribute values, such as skills, and corresponding inputs, e.g., job titles.

This disclosure describes an unsupervised machine learning-based taxonomy manager in the context of determining relationships between skills and job titles. However, the disclosed approaches have broader application to generating taxonomies including relationships between attribute values and particular inputs. Additionally, the described approaches are not limited to uses within social media applications, but can be employed to generate and manage taxonomies in other types of application software systems.

Figure 1:
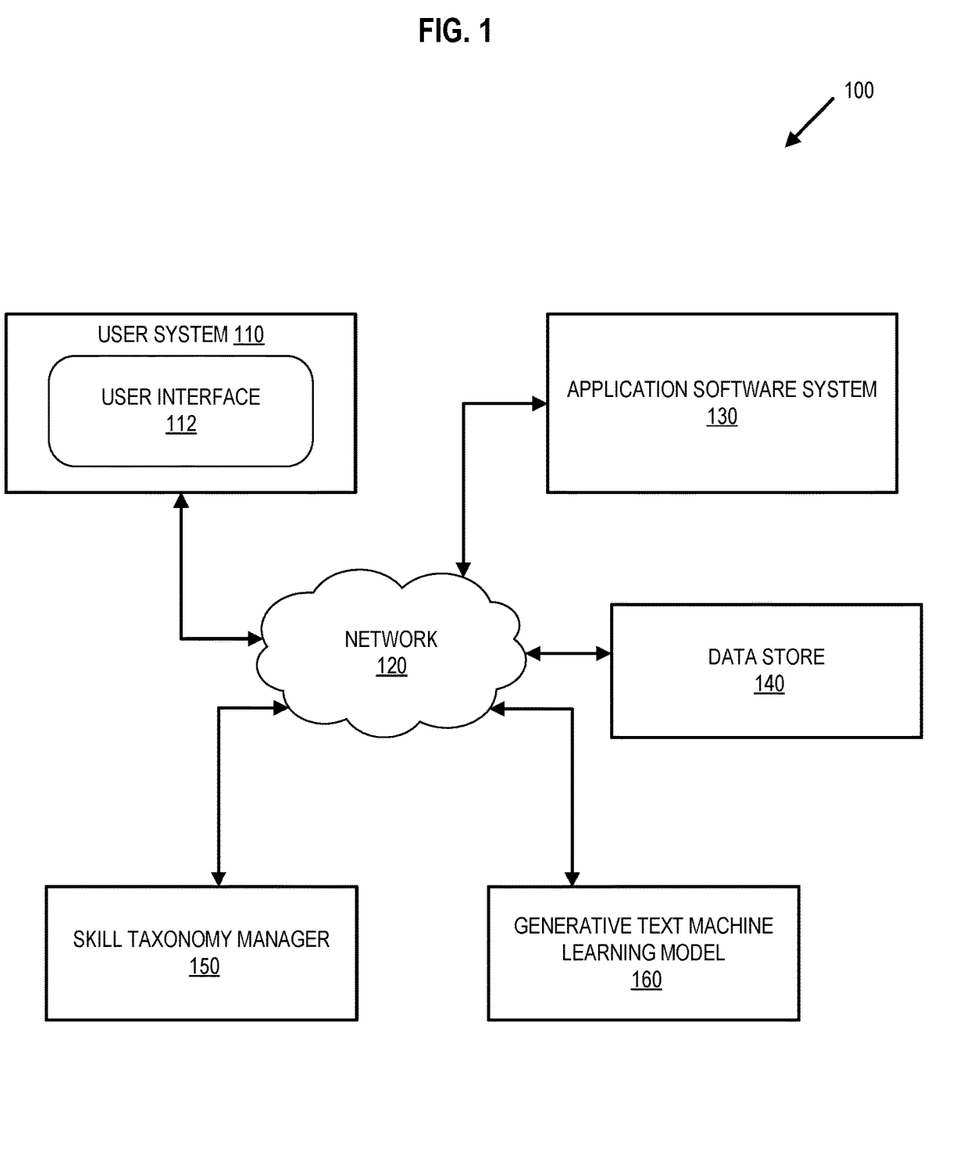
FIG. 1 illustrates an example computing system 100 that includes a skill taxonomy manager 150 in accordance with some embodiments of the present disclosure.

FIG. 1 illustrates an example computing system 100 that includes a skill taxonomy manager 150 and a generative text machine learning model 160.

In the embodiment of FIG. 1, computing system 100 includes a user system 110, a network 120, an application software system 130, a data store 140, skill taxonomy manager 150, and generative text machine learning model 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 is a memory storage. Data store 140 stores, for example, job titles and generated sentences. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by skill taxonomy manager 150. Examples of application software system 130 include but are not limited to connections network software, such as social media platforms, and systems that are or are not based on connections network software, such as general-purpose search engines, job search software, recruiter search software, sales assistance software, advertising software, learning and education software, or any combination of any of the foregoing.

While not specifically shown, it should be understood that any of user system 110, application software system 130, data store 140, skill taxonomy manager 150, and generative text machine learning model 160 includes an interface embodied as computer programming code stored in computer memory that when executed causes a computing device to enable bidirectional communication with any other of user system 110, application software system 130, data store 140, skill taxonomy manager 150, and generative text machine learning model 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, skill taxonomy manager 150, and generative text machine learning model 160 is implemented using at least one computing device that is communicatively coupled to electronic communications network 120. Any of user system 110, application software system 130, data store 140, skill taxonomy manager 150, and generative text machine learning model 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, skill taxonomy manager 150, and/or generative text machine learning model 160. User system 110 is configured to communicate bidirectionally with any of application software system 130, data store 140, skill taxonomy manager 150, and/or generative text machine learning model 160 over network 120.

The features and functionality of user system 110, application software system 130, data store 140, skill taxonomy manager 150, and generative text machine learning model 160 are implemented using computer software, hardware, or software and hardware, and can include combinations of automated functionality, data structures, and digital data, which are represented schematically in the figures. User system 110, application software system 130, data store 140, skill taxonomy manager 150, and generative text machine learning model 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 5:
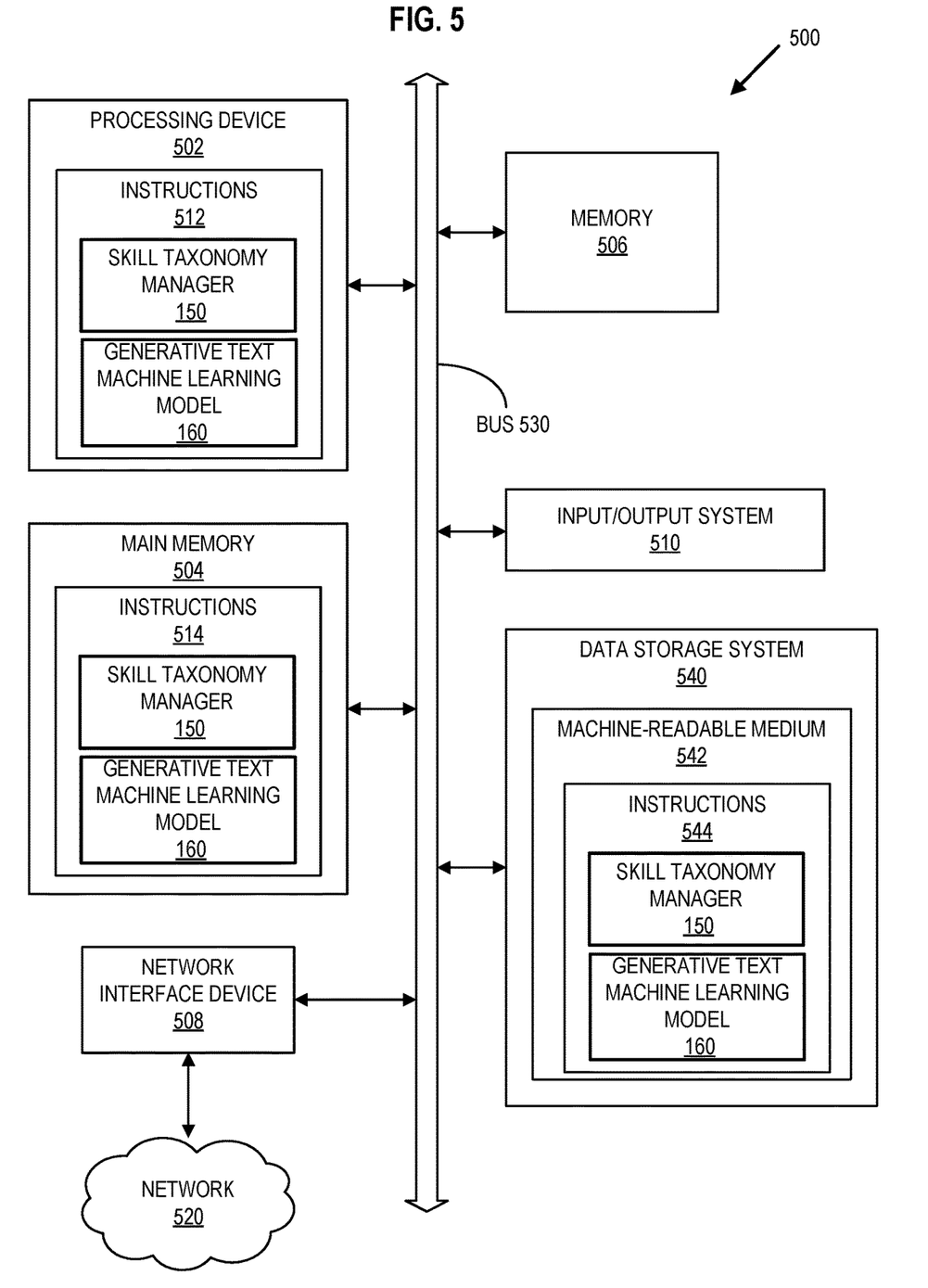
FIG. 5 is a block diagram of an example computer system in which embodiments of the present disclosure can operate.

Skill taxonomy manager 150 can receive inputs, such as job titles or other seed words, generate sentences from the inputs, and identify skills related to the inputs based on the generated sentences. In some embodiments, the application software system 130 includes at least a portion of the skill taxonomy manager 150. As shown in FIG. 5, the skill taxonomy manager 150 can be implemented as instructions stored in a memory, and a processing device 502 can be configured to execute the instructions stored in the memory to perform the operations described herein.

The skill taxonomy manager 150 takes as input a seed word or phrase, such as a job title received from the user system 110 or the application software system 130. The skill taxonomy manager 150 applies generative text machine learning model 160 to the input and receives, from generative text machine learning model 160, sentences generated by the generative text machine learning model 160. The skill taxonomy manager 150 identifies a set of skills related to the input based on the sentences generated by generative text machine learning model 160. Sentences as used herein may refer to unstructured natural language text including, sentences, phrases, groups of sentences or phrases, and/or paragraphs.

A set of skills determined to be related to the input is output from the skill taxonomy manager 150 for use by the user system 110, and/or is stored in the data store 140. The disclosed technologies are described with reference to an example use case of identifying skills that are related to a particular job title; for example, a job title contained in a user profile, a company profile, or a profile of another type of entity. The disclosed technologies are not limited to related skill identification in social graph applications but can be used to perform skill management based on the application of a generative text machine learning model to seed words, more generally. The disclosed technologies can be used by many different types of network-based applications in which seed words are used to generate sentences from which related skills are identified.

The generative text machine learning model 160 receives the seed words (e.g., job title) from the skill taxonomy manager 150. The generative text machine learning model 160 is trained to generate output text, such as sentences, job listings, or other texts, from the seed words or job title. In some implementations, the generative text machine learning model 160 is a causal language model that is trained to generate sentences that are related to the seed words. In the described implementations, the generative text machine learning model 160 is trained to generate sentences that include skills that are related to the job title. Additional details of sentence generation and skill identification are described with reference to FIG. 4. Further details regarding the operations of the skill taxonomy manager 150 and generative text machine learning model 160 are described below.

Figure 2:
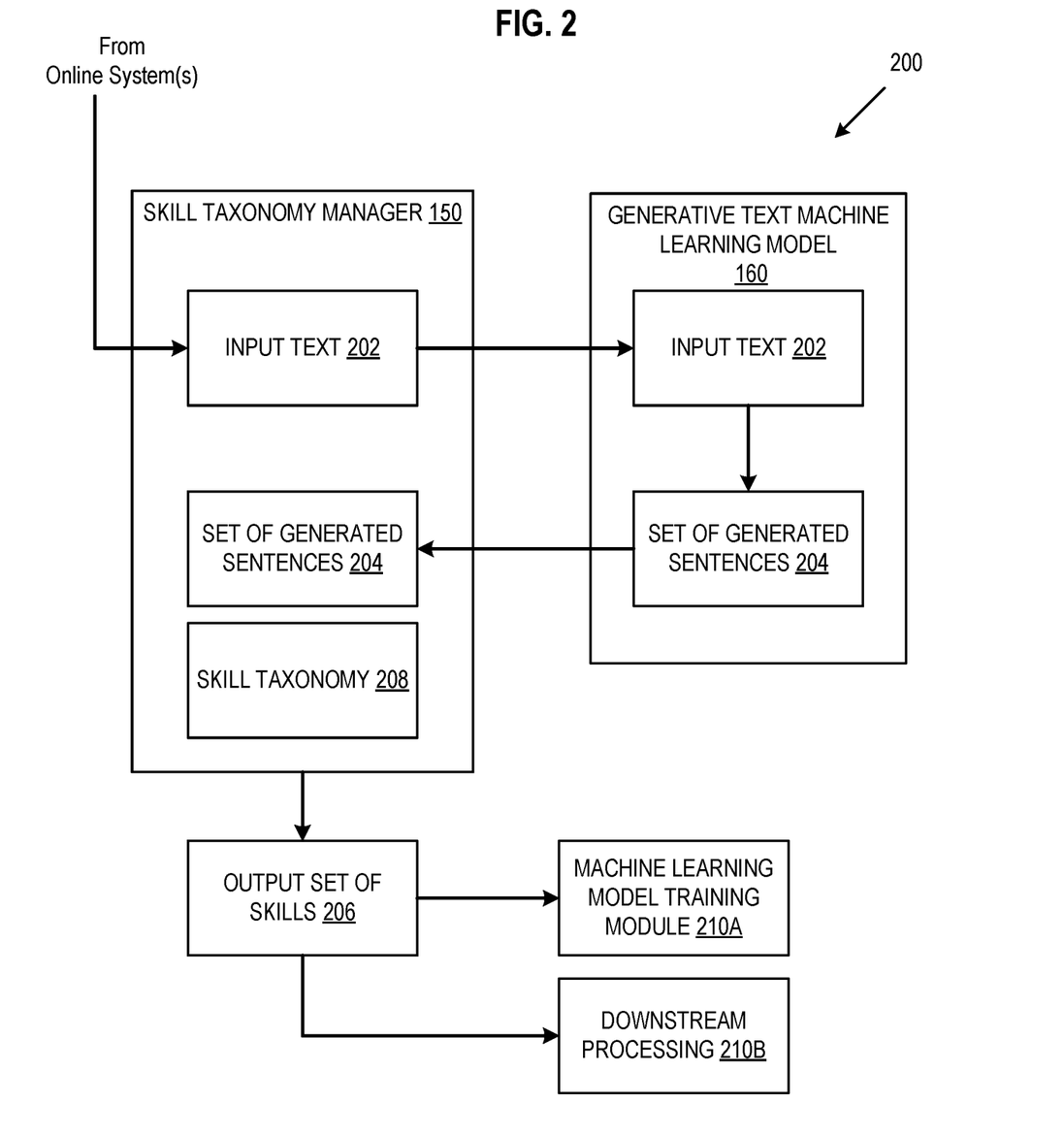
FIG. 2 is a flow diagram of an example method 200 to identify skills related to a particular input using unsupervised machine learning, in accordance with some embodiments of the present disclosure.

FIG. 2 is a flow diagram of an example method 200 to generate and output skills using a generative text machine learning model in accordance with some embodiments of the present disclosure. In some embodiments, the skill taxonomy manager 150 communicates a job title 202 to the generative text machine learning model 160. As described above with regard to FIG. 1, the job title 202 is received from, for example, user system 110 or application software system 130. The generative text machine learning model 160 receives the job title 202 and generates a set of generated sentences 204 based on the job title 202. Because the generative text machine learning model 160 has been trained on a non-domain specific set of training data, the set of generated sentences 204 includes a wide variety of different types of sentences, for example, a job listing, a role description, a description of the job title, and/or a sentence about the job title. Examples of generated sentences are described below with regard to FIG. 4.

In some embodiments, the generative text machine learning model 160 is trained on a data set that includes multiple sources such as the PILE dataset. The generative text machine learning model 160 applies a transformer architecture to produce text using a deep learning network to generate the text. In one example, the training can be unsupervised learning using an autoregressive language model so that the generative text machine learning model 160 generates a prediction of the words in a training sentence using the previous words in the training sentence.

In an example, the job title 202 is the phrase "machine learning engineer." The generative text machine learning model 160 generates sentences such as "A Machine Learning Engineer with experience in developing machine learning models for ecommerce, financial trading, data mining and predictive analytics are key skills in this role. The ideal candidate will have: Deep knowledge of the basics of Python." The generated sentences are provided from the generative text machine learning model 160 to the skill taxonomy manager 150. The skill taxonomy manager 150 identifies or extracts skills from the generated sentences, such as "Python programming language," "data mining," or "predictive analytics." The identified or extracted skills are shorter in length, i.e., contain fewer text characters, then the generated sentences themselves. In some embodiments, the skill taxonomy manager 150 searches the generated sentences for strings that match skills in a skill taxonomy 208. In other embodiments, the skill taxonomy manager 150 identifies skills using a semantic analysis of similarity between one or more words in a generated sentence and one or more skills in the skill taxonomy 208.

For example, the skill taxonomy manager 150 tokenizes the sentences and matches the tokens in the sentence with one or more tokens that each represent a skill in the taxonomy. For instance, for the sentence "Payroll Lead Generation For Small Business Owners A Lead Generation Strategy for Small Business Owners There are many benefits to building your business from scratch for starters, but there are also many drawbacks and many steps you need to be taken to ensure you," the skill taxonomy manager 150 tokenizes the sentences and performs string matching with each token and multiple tokens of the taxonomy. In this example, the sentence produced similarity scores against various skills in the taxonomy and an example skill "small business" is selected, because it has a string similarity that exceeds a threshold similarity. The threshold similarity is configured so that a string having a similarity that exceeds the threshold indicates that the skill is represented in the sentence.

While FIG. 2 is described with only one iteration, the skill taxonomy manager 150 can request, and the generative text machine learning model 160 can generate, any number of sentences, such as 100 sentences, 1000 sentences, 100,000 sentences, etc. For example, the skill taxonomy manager 150 can provide the number of requested sentences as an argument when providing the job title 202 to the generative text machine learning model 160.

The skill taxonomy manager 150 identifies skills within the generated sentences and determines a ranking for the identified skills. Continuing with the previous example, if the generative text machine learning model 160 produces 100 sentences in the set of generated sentences 204, and 15 of those sentences included the skill "data mining" while only 5 sentences included the skill "Python programming language," the "data mining" skill would be ranked above the "Python programming language" skill. In some embodiments, skill taxonomy 208 includes a set of skills that represent various attributes of a user profile, resume, job posting, or document. The skill taxonomy 208 is a predefined set of skills that is relevant to the social media platform. For example, the skill taxonomy is curated by a user or an additional process that determines that certain skills in the skill taxonomy are relevant to the social media platform.

The skill taxonomy manager 150 generates an output set of skills 206 that includes a subset of the identified skills, such as a top-k ranking, where k is a positive integer. Alternatively, the skill taxonomy manager 150 outputs all of the skills identified from the set of generated sentences 204. In some embodiments, the output set of skills 206 is provided to a machine learning training module 210A for updating or retraining the generative text machine learning model 160. In other embodiments, the output set of skills 206 is provided to downstream processing 210B.

Figure 3:
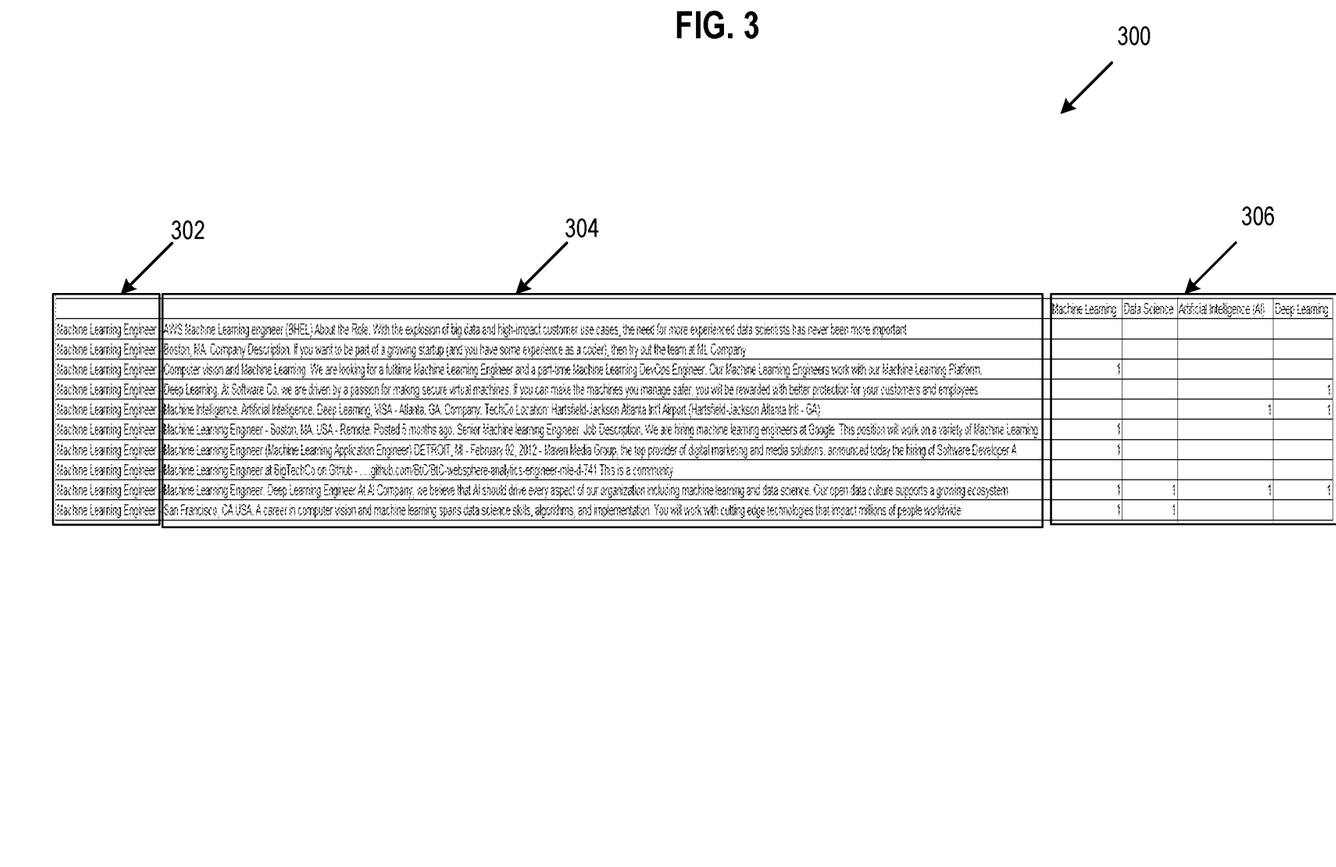
FIG. 3 is an example of a data set including a job title, a set of sentences generated using an unsupervised generative text machine learning model, and skills identified as related to the set of sentences, in accordance with some embodiments of the present disclosure.

FIG. 3 is an example of a data set that may be generated by skill taxonomy manager 150, including the job title, the set of sentences generated by the generative text machine learning model 160 based on the job title, and the identified skills identified by the skill taxonomy manager 150, in accordance with some embodiments of the present disclosure. For example, the job title 302 is input, by the skill taxonomy manager 150, into the generative text machine learning model 160. An example of a job title 302 is "machine learning engineer."

The generative text machine learning model 160 generates a set of generated sentences 304 that include content relating to the job title 302. The set of skills 306 extracted from the set of sentences 304 includes, for example, the skills "machine learning," "data science," "artificial intelligence," and "deep learning." The set of skills 306 includes a number of occurrences identifier or count (e.g., "1") that indicates whether and/or how many times a skill is identified in the generated sentences. Thus, a row of a data set generated by skill taxonomy manager 150 includes, for example, a sentence identifier, a skill identifier, and an occurrence count. The skill taxonomy manager 150 ranks the skills based on occurrences in the generated sentences. In the example illustrated by FIG. 3, the "machine learning" skill ranks the highest with five occurrences, "deep learning" ranks second highest with three occurrences. The skills of "data science" and "artificial intelligence" share a third highest rank with two occurrences each. The skill taxonomy manager 150 creates a frequency distribution from the set of skills 306 by aggregating the number of occurrences of each skill across all of the generated sentences. As described in the example above, the frequency distribution would be [5, 3, 2, 2].

In some embodiments, the skill taxonomy manager 150 outputs the set of skills including, for example, all of the identified skills, or outputs only the highest ranked skill, or outputs any subset of the set of skills. While the example of FIG. 3 illustrates four skills, any number of skills, such as from a database of skills, can be used.

Figure 4:
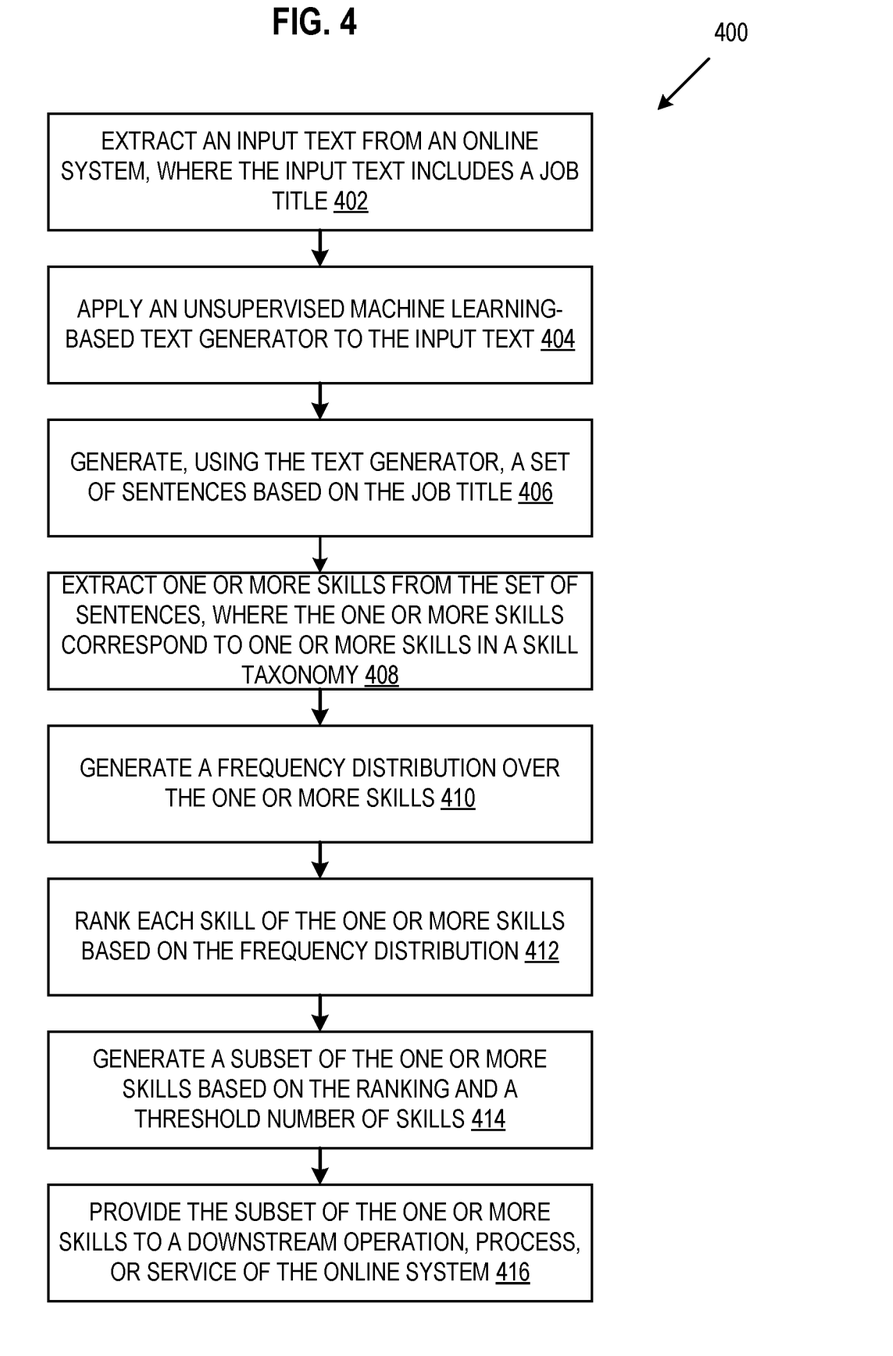
FIG. 4 is a flow diagram of an example method 500 of identifying skills related to an input using an unsupervised generative text machine learning model and an input job title, in accordance with some embodiments of the present disclosure.

FIG. 4 is a flow diagram of an example method 400 of generating output skills using a generative text machine learning model and a job title in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the skill taxonomy manager 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the skill taxonomy manager 150 extracts an input text from an online system, where the input text includes a job title. For example, the skill taxonomy manager 150 receives an input job posting or an input user profile from a user system 110, and extracts a job title from the job posting or profile. In some embodiments, the input job posting or an input user profile includes text content that includes a job title, job description, role requirements, or other text. The skill taxonomy manager searches the input text for a job title, using, for example, a string search or a text extraction process such as a named entity recognition algorithm.

At operation 404, the skill taxonomy manager 150 applies a generative text machine learning model to the input text. For example, the skill taxonomy manager 150 inputs the job title into the generative text machine learning model 160 to produce multiple generated sentences from the job title. In some embodiments, the generative text machine learning model 160 is a causal text generator trained to generate sentences from an input seed word or input seed phrase such as the job title.

At operation 406, the generative text machine learning model 160 generates a set of sentences based on the input job title from the skill taxonomy manager 150. For example, the generative text machine learning model 160 produces multiple generated sentences for each input job title. The sentences include, for example, job descriptions, role requirements, or other text relating to the input job title.

At operation 408, the skill taxonomy manager 150 extracts one or more skills from the set of sentences, where the one or more skills correspond to skills in a skill taxonomy. For example, the skill taxonomy manager 150 searches the set of sentences generated by the generative text machine learning model 160 for one or more skills that match skills that are contained in a pre-existing skill taxonomy.

At operation 410, the skill taxonomy manager 150 generates a frequency distribution over the one or more skills. For example, the skill taxonomy manager 150 counts a number of occurrences in the set of sentences for each skill extracted from the set of sentences. For instance, as described with regard to FIG. 3, different skills occur with different frequencies in the set of sentences that are generated by the generative text machine learning model. The skill taxonomy manager 150 creates a frequency distribution of the extracted skills occurring in the set of sentences.

In some embodiments, the skill taxonomy manager 150 compares the frequency distribution to a threshold skill distribution. In some embodiments, the threshold skill distribution is a minimum number of different skills that are identified in the generated sentences. In other embodiments, the threshold skill distribution is a difference between a skill with the greatest number of occurrences and a different skill with the lowest number of occurrences. If the frequency distribution does not satisfy the threshold skill distribution, the generative text machine learning model generates additional sentences from the same input text. For example. the frequency distribution fails to satisfy the threshold skill distribution if the number of identified skills is less than the threshold skill distribution or if the difference between a skill with the greatest number of occurrences and a different skill with the lowest number of occurrences is less than the threshold skill distribution. Similar to the operation described at operation 406, the generative text machine learning model 160 generates additional sentences to increase the total number of skills contained in the updated set of sentences including the additional sentences. After generating the additional sentences, the skill taxonomy manager generates an additional frequency distribution using the set of sentences and the additional sentences. The additional frequency distribution is compared to the threshold skill distribution. In some embodiments, the additional frequency distribution satisfies the threshold skill distribution if the number of identified skills is greater than the threshold skill distribution or if the difference between a skill with the greatest number of occurrences and a different skill with the lowest number of occurrences is greater than the threshold skill distribution.

At operation 412, in response to determining that the additional frequency distribution satisfies the threshold skill distribution, the skill taxonomy manager 150 assigns a ranking score to each skill of the one or more skills based on the additional frequency distribution. For example, the skill taxonomy manager 150 ranks each skill of the one or more skills based on the frequency distribution. As described above with regard to FIG. 3, the skill taxonomy manager 113 ranks the skills in descending order of number of occurrences, e.g., from a first skill having the highest number of occurrences in the set of sentences to another skill having a lower number of occurrences in the set of sentences.

At operation 414, the skill taxonomy manager 150 generates a subset of the one or more skills based on a threshold number of skills and the ranking. For example, the skill taxonomy manager 150 reduces the set of skills from a set of 100 skills extracted from the plurality of sentences to a top-k (e.g., top 10) set of skills based on the ranking of skills by the number of occurrences.

At operation 416, the skill taxonomy manager 150 provides the subset of the one or more skills generated at operation 414 to one or more downstream operations, processes, or services of the online system. For example, the skill taxonomy manager 150 outputs the skill subset to a display of the user system 110 (e.g., a report, analytics summary, or dashboard), and/or stores the skill subset in data store 140. In some embodiments, skill taxonomy manager 150 generates a skill recommendation from the subset based on a comparison of the skill subset with a profile of the user. For example, the skill taxonomy manager 150 identifies a skill in the subset that is not present in the profile of the user and presents the identified skill to the user as a suggestion when the user is searching for a job posting that contains the job title that was used to generate the skill subset.

FIG. 5 illustrates an example machine of a computer system 500 within which a set of instructions, for causing the machine to perform any one or more of the methodologies discussed herein, can be executed. In some embodiments, the computer system 500 can correspond to a component of a networked computer system (e.g., the computer system 100 of FIG. 1) that includes, is coupled to, or utilizes a machine to execute an operating system to perform operations corresponding to the skill taxonomy manager 150 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a memory 506 (e.g., flash memory, static random access memory (SRAM), etc.), an input/output system 510, and a data storage system 540, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 512 for performing the operations and steps discussed herein.

The computer system 500 can further include a network interface device 508 to communicate over the network 520. Network interface device 508 can provide a two-way data communication coupling to a network. For example, network interface device 508 can be an integrated-services digital network (ISDN) card, cable modem, satellite modem, or a modem to provide a data communication connection to a corresponding type of telephone line. As another example, network interface device 508 can be a local area network (LAN) card to provide a data communication connection to a compatible LAN. Wireless links can also be implemented. In any such implementation network interface device 508 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 500.

Computer system 500 can send messages and receive data, including program code, through the network(s) and network interface device 508. In the Internet example, a server can transmit a requested code for an application program through the Internet and network interface device 508. The received code can be executed by processing device 502 as it is received, and/or stored in data storage system 540, or other non-volatile storage for later execution.

The input/output system 510 can include an output device, such as a display, for example a liquid crystal display (LCD) or a touchscreen display, for displaying information to a computer user, or a speaker, a haptic device, or another form of output device. The input/output system 510 can include an input device, for example, alphanumeric keys and other keys configured for communicating information and command selections to processing device 502. An input device can, alternatively or in addition, include a cursor control, such as a mouse, a trackball, or cursor direction keys for communicating direction information and command selections to processing device 502 and for controlling cursor movement on a display. An input device can, alternatively or in addition, include a microphone, a sensor, or an array of sensors, for communicating sensed information to processing device 502. Sensed information can include voice commands, audio signals, geographic location information, and/or digital imagery, for example.

The data storage system 540 can include a machine-readable storage medium 542 (also known as a computer-readable medium) on which is stored one or more sets of instructions 544 or software embodying any one or more of the methodologies or functions described herein. The instructions 544 can also reside, completely or at least partially, within the main memory 504 and/or within the processing device 502 during execution thereof by the computer system 500, the main memory 504 and the processing device 502 also constituting machine-readable storage media.

In one embodiment, the instructions 544 include instructions to implement functionality corresponding to a skill taxonomy manager (e.g., the skill taxonomy manager 150 of FIG. 1). While the machine-readable storage medium 542 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes extracting an input text from an online system, the input text comprising a job title; applying an unsupervised generative text machine learning model to the input text; generating, by the generative text machine learning model, a plurality of sentences based on the job title; extracting one or more skills from the plurality of sentences, wherein the extracted one or more skills correspond to one or more skills in a skill taxonomy; generating a frequency distribution over the extracted one or more skills; ranking each skill of the extracted one or more skills based on the frequency distribution; generating a subset of the extracted one or more skills based on the ranking and a threshold number of skills; and providing the subset of the extracted one or more skills to a downstream operation, process, or service of the online system.

An example 2 includes the subject matter of example 1, and further includes extracting the one or more skills from the plurality of sentences, the extracting including identifying one or more skills in the plurality of sentences that do not correspond to the one or more skills in the skill taxonomy; and adding the identified one or more skills to the skill taxonomy. An example 3 that includes the subject matter of example 1 or example 2, and further includes generating a skill recommendation based on comparing the subset of the extracted one or more skills with a set of skills identified in an entity profile. An example 4 that includes the subject matter of any of examples 1-3 and further includes training the generative text machine learning model by applying unsupervised machine learning to a domain-independent set of unlabeled and unstructured training data. An example 5 that includes the subject matter of any of examples 1-4 and further includes comparing the frequency distribution to a threshold skill distribution; and in response to determining that the frequency distribution does not satisfy the threshold skill distribution, generating additional sentences from the input text. An example 6 that includes the subject matter of any of examples 1-5 and further includes generating an additional frequency distribution using the plurality of sentences and the additional sentences; comparing the additional frequency distribution to the threshold skill distribution; and in response to determining that the additional frequency distribution satisfies the threshold skill distribution, ranking each skill of the extracted one or more skills based on the additional frequency distribution. An example 7 that includes the subject matter of any of examples 1-6, where extracting the input text from the online system further includes receiving an input seed phrase from a user system; and determining the input text based on the input seed phrase.

In an example 8, a method including extracting an input text from an online system, the input text comprising a job title; applying an unsupervised generative text machine learning model to the input text; generate, by the generative text machine learning model, a plurality of sentences based on the job title; extracting one or more skills from the plurality of sentences, wherein the extracted one or more skills correspond to one or more skills in a skill taxonomy; generate a frequency distribution over the extracted one or more skills; ranking each skill of the extracted one or more skills based on the frequency distribution; generating a subset of the extracted one or more skills based on the ranking and a threshold number of skills; and providing the subset of the extracted one or more skills to a downstream operation, process, or service of the online system.

An example 9 includes the subject matter of example 8 where to extract the one or more skills from the plurality of sentences, the method includes identifying one or more skills that do not correspond to one or more skills in the skill taxonomy; and adding the identified one or more skills to the skill taxonomy. An example 10 includes the subject matter of example 8 or 9 further including generating a recommended skill based on comparing the subset of the extracted one or more skills with a set of skills identified in an entity profile. An example 11 includes the subject matter of any of examples 8-10 further including configuring the generative text machine learning model as a causal text generator that generates a set of sentences from a seed word or a job title. An example 12 includes the subject matter of any of examples 8-11 further including comparing the frequency distribution to a threshold skill distribution; and in response to determining that the frequency distribution does not satisfy the threshold skill distribution, generating additional sentences from the input text. An example 13 includes the subject matter of any of examples 8-12 further including generating an additional frequency distribution using the plurality of sentences and the additional sentences; comparing the additional frequency distribution to the threshold skill distribution; and in response to determining that the additional frequency distribution satisfies the threshold skill distribution, ranking each skill of the extracted one or more skills based on the additional frequency distribution. An example 14 includes the subject matter of any of examples 8-13 where to extract the input text from the online system, the method further includes receiving an input seed phrase from a user system; and determine the input text from the input seed phrase.

In an example 15, a system includes at least one memory device; and a processing device, operatively coupled to the at least one memory device, to: extract an input text from an online system, the input text comprising a job title; apply an unsupervised generative text machine learning model to the input text; generate, by the generative text machine learning model, a plurality of sentences based on the job title; extract one or more skills from the plurality of sentences, wherein the extracted one or more skills correspond to one or more skills in a skill taxonomy; generate a frequency distribution over the extracted one or more skills; compare the frequency distribution to a threshold skill distribution; in response to determining that the frequency distribution does not satisfy the threshold skill distribution, generate additional sentences from the input text; generate an additional frequency distribution using the plurality of sentences and the additional sentences; compare the additional frequency distribution to the threshold skill distribution; and provide the extracted one or more skills to a downstream operation, process, or service of the online system.

An example 16 including the subject matter of example 15 where to extract the input text from the online system, the processing devices is to: receive an input seed phrase from a user system; and determine the input text from the input seed phrase. An example 17 includes the subject matter of examples 15 or 16 where the processing device is to train the generative text machine learning model as a causal text generator that generates a set of sentences from a seed word or a job title. An example 18 that includes any of examples 15-17 where the processing device is to generate a skill recommendation based on comparing the extracted one or more skills with a set of skills identified in an entity profile. An example 19 that includes any of examples 15-18 where to extract the one or more skills from the plurality of sentences, the processing device is to: identify one or more skills that do not correspond to a skill in the skill taxonomy; and add the identified one or more skills to the skill taxonomy. An example 20 that includes any of examples 15-19 where the processing device is to: in response to determining that the additional frequency distribution satisfies the threshold skill distribution, rank each skill of the extracted one or more skills based on the additional frequency distribution; and generate a subset of the extracted one or more skills based on the ranking.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A method comprising:
extracting an input text from an online system, the input text comprising a job title;
applying an unsupervised generative text machine learning model to the input text;
generating, by the generative text machine learning model, a plurality of sentences based on the job title;
extracting one or more skills from the plurality of sentences, wherein the extracted one or more skills correspond to one or more skills in a skill taxonomy;
generating a frequency distribution over the extracted one or more skills;
ranking each skill of the extracted one or more skills based on the frequency distribution;
comparing the frequency distribution to a threshold skill distribution;
in response to determining that the frequency distribution does not satisfy the threshold skill distribution, generating additional sentences from the input text;
generating an additional frequency distribution using the plurality of sentences and the additional sentences;
comparing the additional frequency distribution to the threshold skill distribution;
in response to determining that the additional frequency distribution satisfies the threshold skill distribution, ranking each skill of the extracted one or more skills based on the additional frequency distribution;
generating a subset of the extracted one or more skills based on the ranking and a threshold number of skills; and providing the subset of the extracted one or more skills to a downstream operation, process, or service of the online system.

2. The method of claim 1, wherein extracting the one or more skills from the plurality of sentences comprises:
identifying one or more skills in the plurality of sentences that do not correspond to the one or more skills in the skill taxonomy; and
adding the identified one or more skills to the skill taxonomy.

3. The method of claim 1, further comprising generating a skill recommendation based on comparing the subset of the extracted one or more skills with a set of skills identified in an entity profile.

4. The method of claim 1, further comprising training the generative text machine learning model by applying unsupervised machine learning to a domain-independent set of unlabeled and unstructured training data.

5. The method of claim 1, wherein extracting the input text from the online system comprises:
receiving an input seed phrase from a user system; and
determining the input text based on the input seed phrase.

6. The method of claim 1, further comprising training the generative text machine learning model as a causal text generator that generates a set of sentences from a seed word or a job title.

7. A method comprising:
extracting, using a string search, an input text from an online system, the input text comprising a job title;
applying an unsupervised generative text machine learning model to the input text;
generating, by the generative text machine learning model, a plurality of sentences from the job title;
extracting one or more skills from the plurality of sentences, wherein the extracted one or more skills correspond to one or more skills in a skill taxonomy;
generating a frequency distribution over the extracted one or more skills, the frequency distribution generated by aggregating a number of occurrences for each skill of the extracted one or more skills;
ranking each skill of the extracted one or more skills based on the frequency distribution;
comparing the frequency distribution to a threshold skill distribution;
in response to determining that the frequency distribution does not satisfy the threshold skill distribution, generating additional sentences from the input text;
generating an additional frequency distribution using the plurality of sentences and the additional sentences;
comparing the additional frequency distribution to the threshold skill distribution;
in response to determining that the additional frequency distribution satisfies the threshold skill distribution, ranking each skill of the extracted one or more skills based on the additional frequency distribution;
generating a subset of the extracted one or more skills by selecting the subset using the ranking and a threshold number of skills, wherein the threshold number of skills define the number of skills in the subset; and
providing the subset of the extracted one or more skills to a downstream operation, process, or service of the online system.

8. The method of claim 7, wherein extracting the one or more skills from the plurality of sentences comprises:
identifying one or more skills that do not correspond to one or more skills in the skill taxonomy; and
adding the identified one or more skills to the skill taxonomy.

9. The method of claim 7, further comprising generating a recommended skill based on comparing the subset of the extracted one or more skills with a set of skills identified in an entity profile.

10. The method of claim 7 further comprising configuring the generative text machine learning model as a causal text generator that generates a set of sentences from a seed word or a job title.

11. The method of claim 7, wherein extracting the input text from the online system comprises:
receiving an input seed phrase from a user system; and
determining the input text from the input seed phrase.

12. The method of claim 7, further comprising training the generative text machine learning model by applying unsupervised machine learning to a domain-independent set of unlabeled and unstructured training data.

13. A system comprising:
at least one memory device; and
a processing device, operatively coupled to the at least one memory device, to:
extract an input text from an online system, the input text comprising a job title;
apply an unsupervised generative text machine learning model to the input text;
generate, by the unsupervised generative text machine learning model, a plurality of sentences based on the job title;
extract one or more skills from the plurality of sentences, wherein the extracted one or more skills correspond to one or more skills in a skill taxonomy;
generate a frequency distribution over the extracted one or more skills;
compare the frequency distribution to a threshold skill distribution;
in response to determining that the frequency distribution does not satisfy the threshold skill distribution, generate additional sentences from the input text;
generate an additional frequency distribution using the plurality of sentences and the additional sentences;
compare the additional frequency distribution to the threshold skill distribution; and
provide the extracted one or more skills to a downstream operation, process, or service of the online system.

14. The system of claim 13, wherein to extract the input text from the online system, the processing device is to:
receive an input seed phrase from a user system; and
determine the input text from the input seed phrase.

15. The system of claim 13, wherein the processing device trains the generative text machine learning model as a causal text generator that generates a set of sentences from a seed word or a job title.

16. The system of claim 13, wherein the processing device generates a skill recommendation based on comparing the extracted one or more skills with a set of skills identified in an entity profile.

17. The system of claim 13, wherein to extract the one or more skills from the plurality of sentences, the processing device is caused to:
identify one or more skills that do not correspond to a skill in the skill taxonomy; and
add the identified one or more skills to the skill taxonomy.

18. The system of claim 13, wherein the processing device is caused to:
in response to determining that the additional frequency distribution satisfies the threshold skill distribution, rank each skill of the extracted one or more skills based on the additional frequency distribution; and generate a subset of the extracted one or more skills based on the ranking.

19. The system of claim 13, wherein the processing device is caused to train the generative text machine learning model by applying unsupervised machine learning to a domain-independent set of unlabeled and unstructured training data.

20. The system of claim 13, wherein the processing device is caused to generate the frequency distribution by aggregating a number of occurrences for each skill of the extracted one or more skills.

\* \* \* \* \*